Nov. 14, 1972  J. C. COGGESHALL  3,702,736

SPECTROPHOTOMETER

Filed June 18, 1971

INVENTOR:
JOHN COGGESHALL
BY Stone, Zummer & Aubel
ATTORNEYS

United States Patent Office 3,702,736
Patented Nov. 14, 1972

3,702,736
SPECTROPHOTOMETER
John C. Coggeshall, 8662 E. Gregory Lane,
Des Plaines, Ill. 60016
Filed June 18, 1971, Ser. No. 154,316
Int. Cl. G01j 3/18, 3/42
U.S. Cl. 356—96                           2 Claims

ABSTRACT OF THE DISCLOSURE

A spectrophotometer is disclosed wherein light from a source of light is directed through a liquid to be analyzed, and the light is reflected from a diffraction grating to provide a spectrum of light which is then caused to selectively impinge on a photocell to thereby give an indication of the absorption characteristics of the liquid.

---

Spectrophotometers, are well-known in the art and, due to their versatility, have become one of the most valuable analytical instruments available for laboratory use. Spectrophotometers normally comprise four major components; that is, a light source, a means for separating the light source into different wave lengths, a sensing means and a readout means. The means for separating the light into its basic wave lengths, may comprise a diffraction grating having transmitting or reflecting surfaces ruled with a large number of closely spaced parallel lines each of which lines function as a scattering center for the light-ing striking it, to thereby provide a linear dispersion or spectral bands. The sensing means may comprise a photosensitive device capable of transducing the light energy received into electrical power. The sensing means may be used to cover a broad spectra or different sensing means may be used to cover various wave length ranges.

Prior art spectrophotometers are, however, relatively complicated, expensive, and generally include complex means for emitting light, collimating the light, dispersing the light, concentrating the light, etc.

Accordingly, it is a principal object of the invention to provide a new concept and structure for spectrophotometers.

It is still another object of the present invention to provide a new spectrophotometer which is relatively simple in structure, facile in operation and relatively inexpensive.

The foregoing and other objects, features, and advantages of the invention will be apparent from the following more particular description of a preferred embodiment of the invention, as illustrated in the accompanying drawings wherein.

Figure 1:
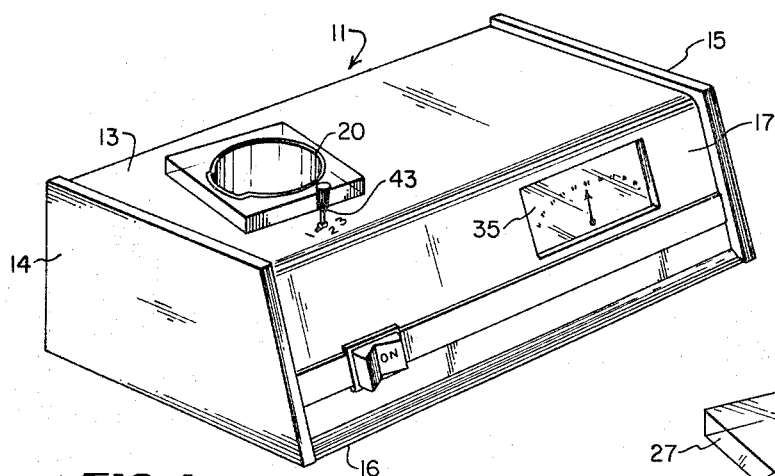
FIG. 1 is a perspective view of one embodiment of the spectrophotometer of the invention.

Referring to the figures, the spectrophotometer of the invention is generally indicated by the numeral 11 and comprises a suitable cabinet or case 12 having a conventional top 13, sides 14 and 15, bottom 16, a slightly inclined front 17, for esthetic and viewing purposes, and a back 18. The top 13 of the spectrophotometer 11 includes an aperture or holder 19 into which a cuvette 20, containing the liquid to be analyzed, can be inserted.

Figure 2:
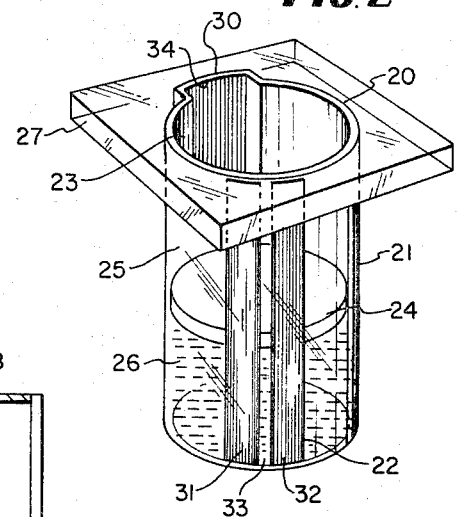
FIG. 2 is a perspective view of a cuvette used in the spectrophotometer of the invention.

In the embodiment shown, see also FIG. 2, cuvette 20 comprises essentially a hollow cylinder 21 having a closed bottom 22, an open top 23; and, an arc portion 30 forming an enlarged section of the cylinder diameter as will be explained more fully hereinbelow.

A liquid-tight wall or bulkhead 24 is formed intermediate the cylinder 21 and essentially parallel to the bottom 22 to divide the cylinder into an upper 25 and a lower compartment 26. The lower compartment 26 is liquid-tight and may include suitable piping to selectively introduce a reference liquid and to allow the said reference liquid to be removed from compartment 26, as desired. Alternatively, compartment 26 can be made as a separate unit with selected reference liquid and attached as by screwing or otherwise suitably affixing it, onto compartment 25.

A flange 27 is formed adjacent the top of the cylinder 21 to enable the cuvette 20 to be placed in holder 19 with the flange 27 bearing against the top 13 of case 12. A pair of opaque bands 31 and 32 are positioned in a longitudinal orientation on the surface of the cylinder 21, and in parallel-spaced relation to each other to provide a narrow slit 33 therebetween. The slit 33, in the embodiment shown, is approximately 1/64 of an inch wide, and extends the length of the cylinder 21.

The cuvette 20 includes a grating 34 positioned in a longitudinally extending direction in cylinder 21 on the interior surface of arc portion 30, and relatively diametrically opposed to the opaque bands 31 and 32. Grating 34 which, in one embodiment has 13,000 lines per inch, is of a refractive type known in the art and commercially available, extends the length of the cylinder 21.

As mentioned, the dimensional relation of the arc portion 30 to the overall cylinder 21 will be discussed hereinbelow, after cuvette 20 and other components of spectrophotometer 11 are described generally.

Figure 3:
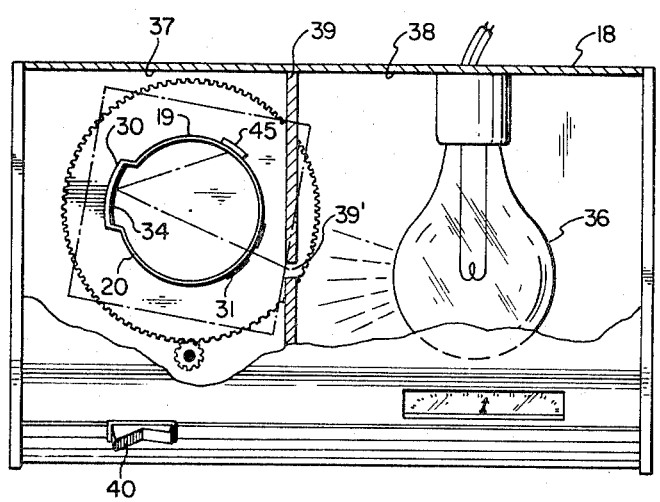
FIG. 3 is a plan view partly in section showing the relative positioning of the cuvette and the light source.
Figure 4:
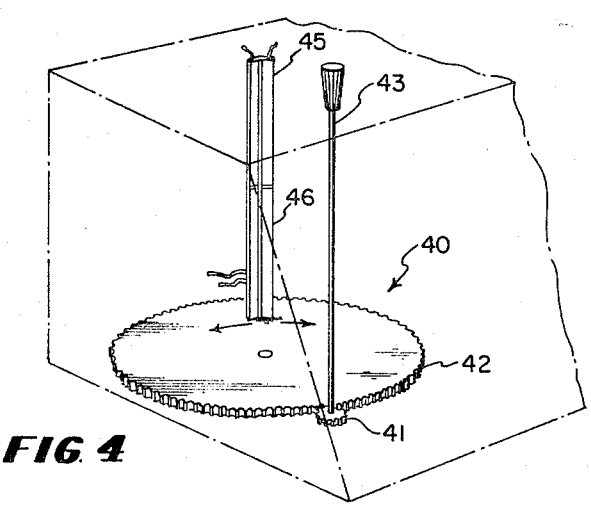
FIG. 4 is a view partly in phantom showing the positioning of the associated photocells relative to the gearing assembly.

As shown in FIG. 3, case 12 is divided into two compartments 37 and 38 by a wall 39 having a narrow slit 39. An ON-OFF switch 40 controls a light source 36, which may be a conventional A.C. operated light bulb, mounted in compartment 37 to provide light to cuvette 20 which is received in holder 19 extending into compartment 36. Compartment 37 is light-tight except for the slit 39' formed in the wall 39 to permit light from source 36 to illuminate the cuvette. A gearing assembly 40 which includes a manually movable drive gear 41 and a driven gear 42 is mounted in compartment 36. The gear 41 is manually rotatable by a calibrated knob or dial 43 having a pointer positionable relative to suitable indicia on top 13.

A pair of vertically aligned photocells 45 and 46 are mounted on the surface of gear 42 to extend upwardly therefrom. Photocells 45 and 46 are rotated as gear 42 is rotated. In one embodiment, photocells 45 and 46 are standard type cells such as manufactured by the Solar Systems, Inc., of Chicago, Ill. The photocells 45 and 46 are mounted in a longitudinal relation to the axis of cylinder 21 and adjacent the external surface of the cylinder. When cuvette 20 is mounted in holder 19, cells 45 and 46 are contiguous with and minimally spaced away from the outside surface of the cylinder 21. Further, photocells 45 and 46 are positioned to be spaced in a radial direction relative to the position of cylinder 21 as well as to grating 34 to receive the reflected light energy from grating 34 as will be explained.

The outputs of cells 45 and 46 are connected through a known type Wheatstone bridge circuit, and suitable circuit to a readout meter 35 to provide either a direct readout from cell 45 or a differential readout from cells 45 and 46. The readout meter 35, in one embodiment, is a conventional millivolt meter.

In operation, light from the source 36 is beamed through the slit 33 in wall 39, and the slit 33 between the opaque bands 31 and 32, as indicated by the dash and arrow lines, to impinge on the grating 34.

The light from the grating 34 is reflected onto the photocells 45 and 46. The beam of light passing through the reference liquid in compartment 26 impinges on photocell 46, and provides a reference output, and the beam of light passing through the sample liquid in compartment 25 impinges on photocell 45. The output of cells 45 and 46, as mentioned above, are coupled through a Wheatstone bridge to couple to meter 35 to provide an output.

Note, that the inventive spectrophotometer possesses double beam capability. More specifically, a first beam of light is directed through a reference liquid in compartment 26 to its associated photocell 46, to provide a reference output. A second beam of light is directed through the sample liquid in compartment 25 to its associated photocell 45 to provide a second or test output. The two outputs may thereafter be electronic compared to provide a ratio indication as desired.

Figure 5:
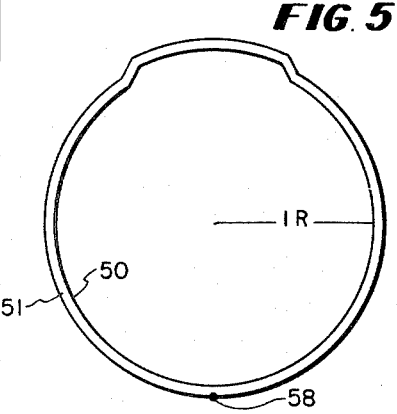
FIG. 5 is a sketch useful in explaining the structure of the cuvette.

FIG. 5 provides an indication of the relative radial dimensions of the cuvette 20. In the embodiment shown, the cuvette 20 comprises a transparent cylinder 21 made of a plastic 1/16 of an inch in thickness. The positioning of the grating 34 can be clearly seen from the drawing wherein the radius of the inside surface 50 of cylinder 21 is given as 1R. The grating 34 is positioned on the arc of an imaginary circle defined by a center 58 located at the outer surface 51 of cylinder 21. The imaginary circle is thus tangent to the inside surface 50 of cylinder 21 on which the grating 34 is positioned.

In operation, the liquid to be analyzed is poured into compartment 25. It has been found convenient to provide a cover over cuvette 20 to shield out ambient light. Source 36 provides a monochromatic or white light which passes through opening 39' in wall 39, through slit 33 formed between opaque strips 31 and 32 and through the liquid to be analyzed, and impinges on the grating 34 from whence it is refracted and replaced through the liquid to photocell 45. The output of the cell 45 is dependent on the characteristics of the liquid being analyzed.

As mentioned above, a double beam and reference comparison capability is provided since the light passing through opening 39' and slit 31, passes through the reference liquid in compartment 26, impinges on grating 34 and is refracted and reflected to photocell 46. The outputs of photocells 45 and 46 can then combined and electronically processed.

While the invention has been particularly shown and described with reference to a preferred embodiment thereof, it will be understood by those skilled in the art that various changes in form and details may be made therein without departing from the spirit and scope of the invention.

I claim:

1. A spectrophotometer, comprising, in combination, a transparent hollow container for containing a liquid to be analyzed, said container essentially forming a modified cylinder, a source of light positioned relative to said cylinder to direct light through said cylinder and said liquid, a diffraction grating being mounted contiguous said cylinder in relatively opposite radial direction to said source, said diffraction grating receiving said light which passes through said liquid for forming a spectrum and reflecting said spectrum, said grating being mounted on an arc portion of said cylinder, said arc portion of said cylinder being related to the remaining portion of said cylinder in the relation 2R to 1R wherein the remaining portion of the cylinder has a radius 1R, and said arc portion forms an arc of an imaginary circle equal to 2R radius with a center of the imaginary circle being an outer surface of the remaining portion of the cylinder, photosensitive means positioned in spaced relation to said diffraction grating for sensing energy in the reflected spectrum, and means for moving said photo sensitive means relative to said grating for providing an output dependent on a particular wave length of light being sensed to thereby relate to the absorption characteristics of said liquid.

2. A spectrophotometer as in claim 1 wherein the container is separated into two compartments, one of said compartments containing a reference liquid, and the other of said compartments containing a sample liquid, and wherein photocell means are mounted to be sensitive to the light passing through the reference liquid and providing an electrical output proportional thereto, a second photocell means mounted to be sensitive to the light passing through the sample liquid and providing an electrical output proportional thereto, and means coupling out the output of said photocell means.

References Cited

UNITED STATES PATENTS

| | | | |
|---|---|---|---|
| 3,578,866 | 5/1971 | Kohler et al. | 356—98 X |
| 2,607,899 | 8/1952 | Cary et al. | 356—97 X |
| 3,215,849 | 11/1965 | Golden | 356—96 |

RONALD L. WIBERT, Primary Examiner

F. L. EVANS, Assistant Examiner

U.S. Cl. X.R.

250—218; 350—162 R; 356—246